(12) United States Patent
Eltantawy et al.

(10) Patent No.: US 11,429,359 B2
(45) Date of Patent: Aug. 30, 2022

(54) METHOD OF DEADLOCK DETECTION AND SYNCHRONIZATION-AWARE OPTIMIZATIONS ON ASYNCHRONOUS ARCHITECTURES

(71) Applicant: Huawei Technologies Co., Ltd., Shenzhen (CN)

(72) Inventors: Ahmed Mohammed ElShafiey Mohammed Eltantawy, Markham (CA); Yaoqing Gao, Toronto (CA); Christopher Rodrigues, San Jose, CA (US); Lijuan Hai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/933,186

(22) Filed: Jul. 20, 2020

(65) Prior Publication Data

US 2021/0004213 A1 Jan. 7, 2021

Related U.S. Application Data

(63) Continuation of application No. PCT/CN2018/092307, filed on Jun. 22, 2018.

(51) Int. Cl.
*G06F 9/44* (2018.01)
*G06F 8/41* (2018.01)
(Continued)

(52) U.S. Cl.
CPC ........... *G06F 8/4435* (2013.01); *G06F 8/454* (2013.01); *G06F 8/71* (2013.01); *G06F 9/524* (2013.01)

(58) Field of Classification Search
CPC .......... G06F 8/4435; G06F 8/454; G06F 8/71; G06F 9/524
(Continued)

(56) References Cited

U.S. PATENT DOCUMENTS 5,784,556 A 7/1998 Sachez et al.
7,552,428 B2 6/2009 Stoodley et al.
(Continued)

FOREIGN PATENT DOCUMENTS

CN 101630268 A 1/2010
CN 105867994 A 8/2016

OTHER PUBLICATIONS

Christoph von Praun, "Detecting Synchronization Defects in Multi-Threaded Object-Oriented Programs", 2004, Swiss Federal Institute of Technology Zurich, 171 page. (Year: 2004).*
(Continued)

*Primary Examiner* — Ted T. Vo
(74) *Attorney, Agent, or Firm* — Slater Matsil, LLP

(57) ABSTRACT

A method for improving the performance of applications executed within asynchronous processor architectures. In an embodiment, a method for improving execution time of compiled synchronized source code on an asynchronous processor architecture includes receiving, by a processing system, synchronized source code comprising synchronization instructions to synchronize execution of the synchronized source code on different pipelines of the asynchronous processor architecture. The method also includes analyzing, by the processing system, the synchronized source code to determine whether the synchronized source code includes a broken code condition. The method also includes, after determining, by the processing system, that the synchronized source code does not include a broken code condition, outputting an optimized synchronized source code generated by performing a corrective action on the synchronized source code to correct a synchronization inaccuracy, inconsistency, or inefficiency in the synchronized source code.

16 Claims, 11 Drawing Sheets

(51) Int. Cl.
*G06F 8/71* (2018.01)
*G06F 9/52* (2006.01)

(58) Field of Classification Search
USPC .................................. 717/127–128, 151–158
See application file for complete search history.

(56) References Cited

U.S. PATENT DOCUMENTS

| | | | |
|---|---|---|---|
| 7,934,031 B2* | 4/2011 | Lines | G06F 9/3869 |
| | | | 710/100 |
| 8,812,820 B2* | 8/2014 | Vorbach | G06F 15/173 |
| | | | 712/15 |
| 9,606,801 B2* | 3/2017 | Tong | G06F 9/30145 |
| 10,776,164 B2* | 9/2020 | Zhao | G06N 20/00 |
| 2006/0212628 A1* | 9/2006 | Lines | G06F 7/00 |
| | | | 710/100 |
| 2013/0179864 A1 | 7/2013 | Lu et al. | |
| 2019/0171604 A1* | 6/2019 | Brewer | G06F 9/3851 |

OTHER PUBLICATIONS

Arvind et al., "Instruction-Level Parallelism in Asynchronous Processor Architectures", 1995, Elsevier Science, pp. 203-214. (Year: 1995).*

Battig, M, et al., "Synchronized-by-Default Concurrency for Shared-Memory Systems", Conference: the 22nd ACM SIGPLAN Symposium, Jan. 2017, 14 Pages.

Chen, Y., et al., "ORC-OpenMP: An OpenMP Compiler Based on ORC", 4th International Conference on Computational Science (ICCS 2004) vol. 3038, May 2004, 10 Pages.

* cited by examiner ability of the present invention relates generally to a system and method for improving execution performance of compiled source code on asynchronous processor architectures.

METHOD OF DEADLOCK DETECTION AND SYNCHRONIZATION-AWARE OPTIMIZATIONS ON ASYNCHRONOUS ARCHITECTURES

This application is a continuation of International Patent Application No. PCT/CN2018/092307, filed on Jun. 22, 2018, which is hereby incorporated by reference in its entirety.

TECHNICAL FIELD

The present invention relates generally to a system and method for improving execution performance of compiled source code on asynchronous processor architectures.

BACKGROUND

Asynchronous processor architectures consist of multiple pipelines that communicate through shared memories and require explicit synchronization. Source code, when translated by a compiler (e.g. compiled) into object code for execution on an asynchronous processor architecture, requires synchronization instructions to be inserted into the source code to enable the object code generated when the source code is compiled to execute properly on the asynchronous processor architecture. However, adding synchronization instructions to the source code to enable the object code to be executed on an asynchronous processor architecture can lead to a broken code condition, such as a deadlock condition, undefined behavior conditions, and data race conditions, if the synchronization instructions are added incorrectly. For complex source codes, the risk that the synchronization instructions are added incorrectly is great. For example, incorrectly adding synchronization instructions to source code can result in a deadlock condition when the compiled source code is executed on an asynchronous processor architecture because a thread may be indefinitely blocked as it is waiting for a specific "event" to be set or signaled, and the event is never set or signaled. Furthermore, even if the synchronization instructions are added correctly (inserted into the source code correctly so as to not lead to a broken code condition), the source code, when compiled into object code for execution on an asynchronous processor architecture, may still be inefficient leading to longer execution time of the object code than is necessary. Furthermore, the existence of synchronization instructions in the source code can limit the use of some of optimizations of the source code by the compiler, which may not always be safe to perform when synchronization instructions involved.

SUMMARY

In accordance with an embodiment, a method improving execution time of compiled synchronized source code on an asynchronous processor architecture includes receiving, by a processing system synchronized source code comprising synchronization instructions to synchronize execution of the synchronized source code on different pipelines of the asynchronous processor architecture. The method also includes determining whether the synchronized source code includes a broken code condition. The method also includes, after determining, by the processing system, that the source code does not include a broken code condition, outputting an indication of an inaccuracy, inconsistency, or inefficiency in the synchronized source code based on an optimization analysis of the synchronized source code.

In accordance with an embodiment, a data processing system includes a memory storage instructions; and one or more processors in communication with the memory. The one or more processors execute the instructions for receiving synchronized source code comprising synchronization instructions to synchronize execution of the synchronized source code on different pipelines of the asynchronous processor architecture. The one or more processors also execute the instructions for determining whether the synchronized source code includes a broken code condition. The one or more processors also execute the instructions for after determining that the synchronized source code does not include a broken code condition, an indication of an inaccuracy, inconsistency, or inefficiency in the synchronized source code based on an optimization analysis of the synchronized source code.

In accordance with an embodiment, a data processing system includes a receiver configured to receive a software program having instructions that include synchronization instructions to synchronize execution of the instructions on different pipes of a processing unit of the asynchronous computing architecture. The data processing system also includes an analyzer configured to analyze synchronization instructions of the synchronized source code to determine whether the synchronized source code includes a deadlock condition. The data processing system also includes an optimizer configured to, after determining that the synchronized source code does not include a broken code condition, an indication of an inaccuracy, inconsistency, or inefficiency in the synchronized source code based on an optimization analysis of the synchronized source code.

In one or more of the preceding aspects, the method further includes, after determining, by the processing system, that the synchronized source code includes a broken source code condition, outputting a report that includes information indicative of the broken source code condition.

In one or more of the preceding aspects, outputting an indication comprises outputting a report that includes information obtained from the optimization analysis.

In one or more of the preceding aspects, wherein the broken code condition is one of a deadlock condition, an undefined behavior condition, and a data race condition.

In one or more of the preceding aspects, the broken code condition is a deadlock condition determined according to a mismatch in the synchronization instructions of the synchronized source code.

In one or more of the preceding aspects, the synchronization instructions comprise wait events and set events, and the mismatch in synchronization statements includes a wait event without a corresponding set event or a set event without a corresponding wait event.

In one or more of the preceding aspects, the method and data processing system present an alert that the synchronized source code includes a broken source code condition when the synchronized source code comprises a missing set event corresponding to a wait event.

In one or more of the preceding aspects, the corrective action comprises providing a report comprising suggestion to a programmer to one of remove the wait event or insert the corresponding set event.

In one or more of the preceding aspects, the synchronization inaccuracy, inconsistency, or inefficiency includes a redundant synchronization instruction.

In one or more of the preceding aspects, the corrective action includes removing the redundant synchronization instruction.

In one or more of the preceding aspects, the corrective action includes reduction of synchronization control overhead.

In one or more of the preceding aspects, the reduction of synchronization control overhead includes merging redundant synchronization instructions.

In one or more of the preceding aspects, the reduction of synchronization control overhead comprises moving one of a wait event or a barrier up in the synchronized source code when no condition in the synchronized source code between a first location in the synchronized source code occupied by the wait event or the barrier and a second location to which the wait event or the barrier is moved depend on the wait event.

In one or more of the preceding aspects, the reduction of synchronization control overhead comprises moving a set event down from a first location in the synchronized source code to a second location in the synchronized source code when no condition in the synchronization instructions depends on the set event is located between the first and the second location.

In one or more of the preceding aspects, the reduction of synchronization control overhead comprises hoisting a synchronization instructions outside of a loop in the synchronized source code when there is no condition in the synchronized source code that uses the synchronization instruction inside the loop.

In one or more of the preceding aspects, the method and data processing system generate a stage graph according to the synchronized source code, wherein the analyzing the synchronized source code to determine whether the synchronized source code includes a broken code condition comprises determining whether the synchronized source code includes a broken code condition according to the stage graph.

In one or more of the preceding aspects, the optimization analysis of the synchronized source code is performed using the stage graph.

In one or more of the preceding aspects, determining whether the synchronized source code includes a broken code condition is based on a diagnostic analysis of the synchronized source code.

In one or more of the preceding aspects, the optimization analysis of the synchronized source code is performed using the stage graph.

An advantage of one or more embodiments of the present disclosure is improved system that detects broken code conditions in synchronized source code resulting from incorrect synchronization, and that when a broken code condition is not detected in the synchronized source code, optimizes the synchronized source code for compiling and execution on a particular pipelined asynchronous processor architecture. Another advantage of one or more embodiments of the present disclosure is reduced overhead from synchronization instructions. Reducing the overhead from synchronization instructions reduces the control flow instructions (e.g., if conditions) in synchronized source code leading to a reduced execution time and improved energy efficiency of the compiled synchronized source code on a pipelined asynchronous processor architecture.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
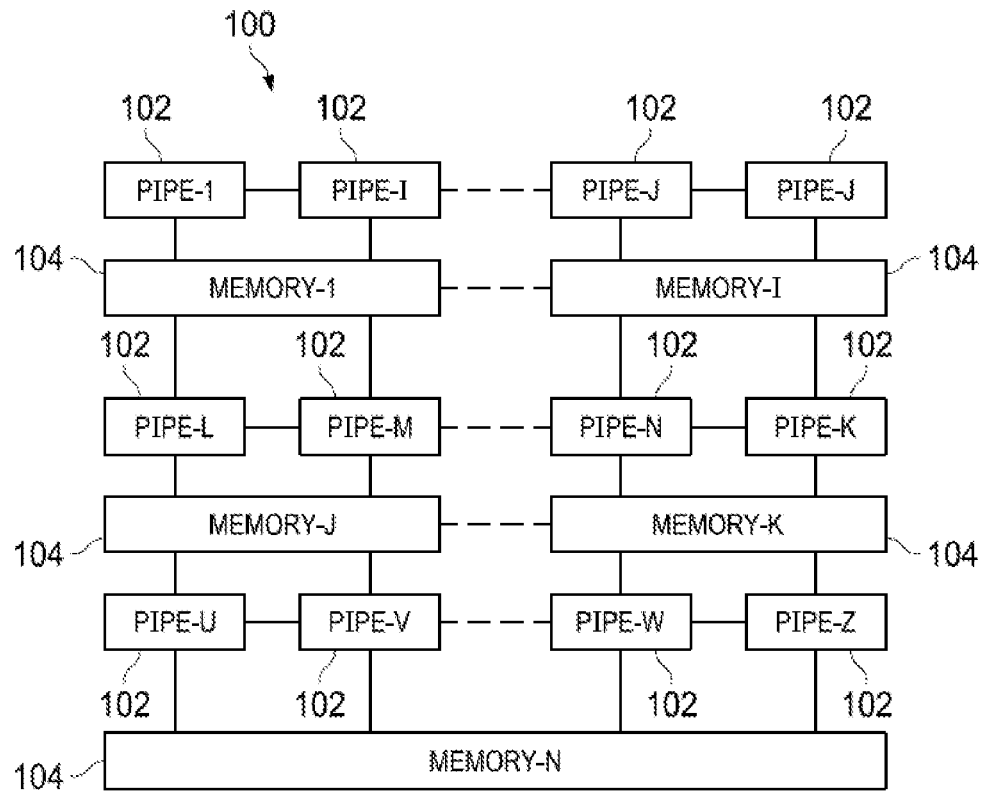
FIG. 1 shows an example of a general asynchronous processor architecture.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present disclosure addresses the problems of incorrect synchronization usage in synchronized source code that is compiled into object code for execution on an asynchronous processor architecture by providing a processing system that analyzes the synchronized source code to detect a broken code condition in the source synchronized code, and when a broken source code condition is detected, it outputs a report that a programmer can use to correct (e.g. rewrite) the synchronized source code to remove the broken source code condition. Furthermore, when the processing system does not detect a broken code condition, the processing system analyses the synchronized source for inefficiencies, inconsistencies, or inaccuracies in synchronization instructions of the synchronized source code, performs corrective actions on synchronization instructions of the synchronized source code to generate optimized synchronized source code in which the inefficiencies, inconsistencies, or inaccuracies in the synchronized source code are corrected, and outputs the optimized synchronized source code which can be complied to object code for execution on the asynchronous processor architecture. As used herein, the term synchronized source code means source code that includes synchronization instructions which were either manually inserted by a programmer or automatically generated to ensure the complied synchronized source code (e.g. the object code generated by a compiler from the synchronized source code) can be executed on a particular asynchronous processor architecture. The terms optimize, optimized, optimizing, and optimization do not mean that that resulting synchronized source code is necessarily the best organization of the synchronization instructions in the resulting synchronized source code or necessarily results in the fastest execution of the object code generated by a compiler from the resulting synchronized source code on a particular asynchronous processor architecture, but merely means that the source code is improved in terms of one or more qualities (e.g., speed, elimination of some redundant synchronization statements, etc.) as compared to the source code before utilization of the disclosed methods and processing system.

The analysis of synchronized source code for broken source code conditions is essential to ensure different synchronization-aware optimizations may be performed on the synchronized source code. Specifically, if the optimization includes moving or removing synchronization instructions, an analysis should confirm that such transformation is safe. Further, for complex source code, writing correct synchronization instructions could be error prone leading to broken source code conditions, such as deadlock conditions, undefined behavior conditions, or data race conditions in the synchronized source code. Therefore analysis of the synchronization instructions in synchronized source code is a useful for programmers to allow them to be informed about potential broken code conditions.

Disclosed herein are methods and processing systems to perform analysis of synchronized source code for detection of broken source code conditions and methods and systems to perform synchronization-aware optimizations on the synchronized source code. As described herein, synchronization-aware optimizations are optimizations on synchronized source code that can be only done when an optimizer of a compiler understands synchronization instructions of the synchronized source code (e.g., understands which parts of the synchronized source code waits before executing on other parts of the synchronized source code). Synchronized source code, before being compiled into object code for execution on an asynchronous processor architecture can be statically split into stages where different stages need explicit synchronization between them. In most cases, the synchronization instructions are represented in an iteration space and can be analyzed statically to reflect the runtime dependencies across stages. Thus, in an aspect, a datastructure that includes the necessary information to perform broken code condition detection and/or synchronization-aware optimizations on the synchronized source code is disclosed. In another aspect, a method to build this datastructure from an existing synchronized source code and methods to use this data structure to perform broken code condition detection and a number of synchronization-aware optimizations are also disclosed.

An advantage of one or more embodiments of the present disclosure is improved programmability of otherwise hard to program systems by providing a processing system that detects broken code conditions, such as deadlock conditions, undefined behavior conditions, or data race conditions, in the synchronized source code that results from incorrect insertion of synchronization instructions into the source code. Another advantage of one or more embodiments of the present disclosure to reduce the overhead from synchronization instructions. Reducing the overhead from synchronization instructions reduces the control flow instructions (e.g., if conditions) in the synchronized source code leading to a reduced execution time and improved energy efficiency.

FIG. 1 shows an example of an asynchronous processor architecture 100. Architecture 100 includes a plurality of pipelines 102 and a plurality of memory spaces 104. Architecture 100 supports asynchronous operations on different memory spaces 104. The asynchronous operations can be memory transfer (through Direct Memory Accesses (DMAs)) or in-memory computation where the source and destination of the operation are in memory 104. Different types of operations belong to different pipelines 102. Operations (also referred to as instructions) executed on different pipelines can be issued in parallel. Operations from the same pipeline can be issued back-to-back such that an operation starts execution before an earlier operation commits its results. Different pipelines 102 can communicate data through shared memory spaces 104.

Figure 2:
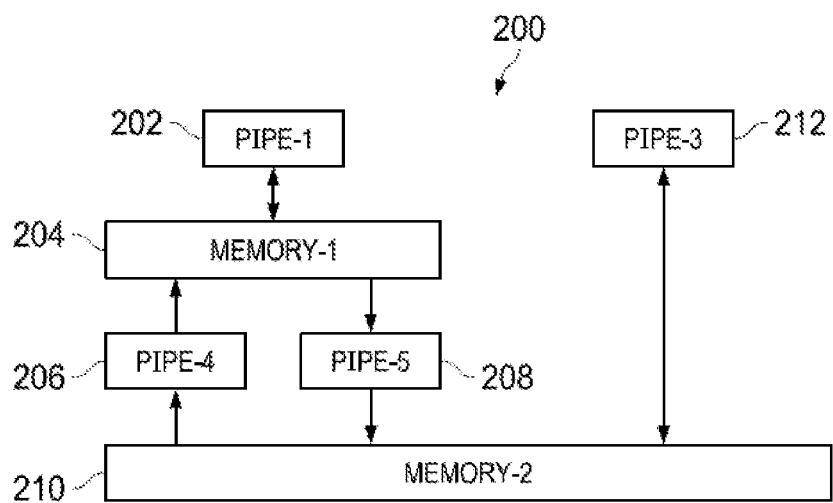
FIG. 2 is an embodiment of an asynchronous processor architecture.

FIG. 2 is an embodiment of an asynchronous processor architecture 200. For simplicity an asynchronous processor architecture 200 that includes 4 pipelines is shown as an example. Architecture 200 includes 4 pipelines 202, 206, 208, 212 and two memory spaces 204, 210. Pipeline 202 (Pipe-1) and pipeline 212 (e.g. Pipe-3) operate in parallel since the operations of neither pipeline 202 nor pipeline 212 depend on the results obtained by the other. Similarly, pipeline 206 (Pipe-4) and pipeline 208 (Pipe-5) operate in parallel. Pipelines 206 and 208 operate in series with pipeline 202 since the results of operations performed by pipelines 206 and 208 are used by pipeline 202.

Figure 3:
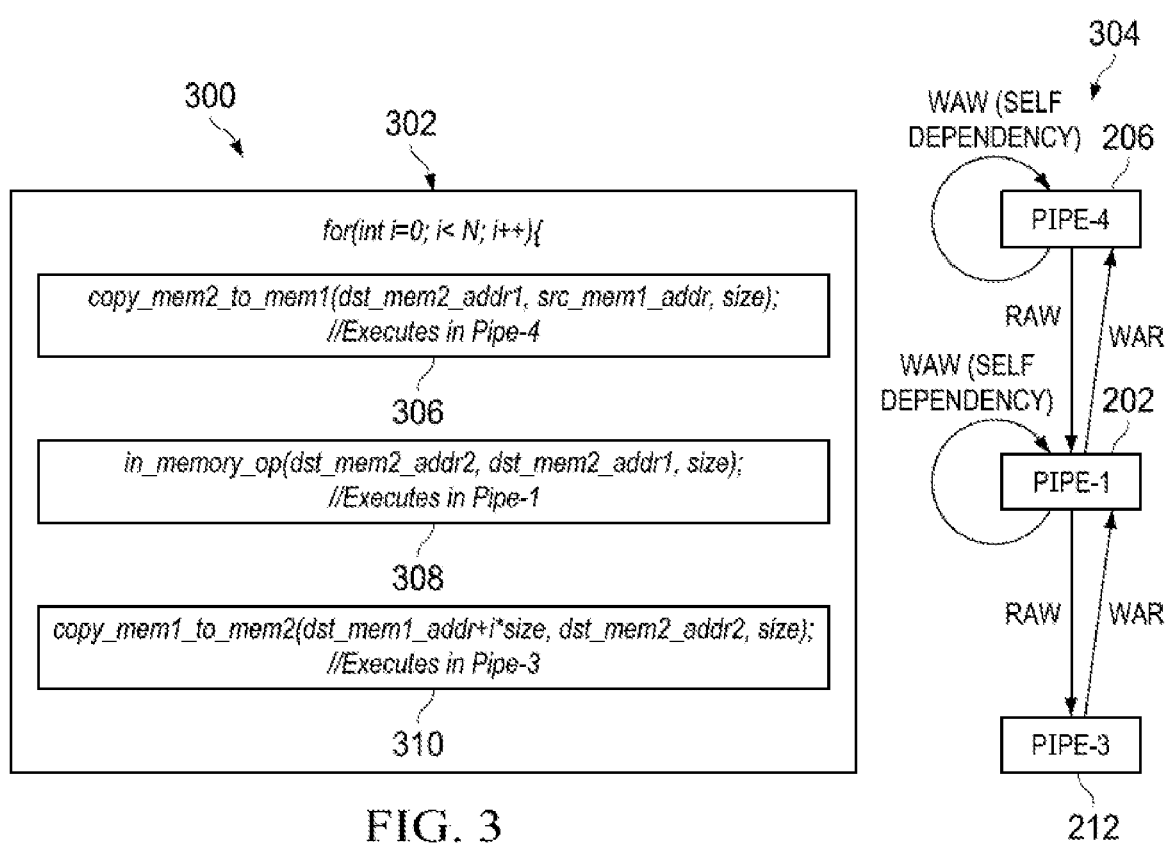
FIG. 3 shows an example of source code that does not include synchronization instructions, a corresponding schematic representation of the various pipelines of the asynchronous processor architecture of FIG. 2, and the hazards exhibited by each.

FIG. 3 shows an example of source code 302 written by a programmer, which when compiled into object code, is executable on the asynchronous process architecture 200 of FIG. 2. FIG. 3 also shows a corresponding schematic representation 304 of the various pipelines, 202, 212, 206 of the asynchronous process architecture 200 of FIG. 2, and the data hazards exhibited by each pipeline 202, 212, 206 due to the source code 302 not including synchronization instructions. The data hazards are represented by the arrows shown in FIG. 3. The example source code 302 shown in FIG. 3 includes a statement (e.g. for (int i=0; i<N; i++, referred to hereinafter as the "for loop") and three instructions 306, 308, 310. The object code generated when the source code 302 is compiled includes machine instructions that are associated with the instructions 304, 306, 308 of the source code 302. The machine instructions of the object code are executable by the various pipelines 202, 212, 206. For example, the machine instruction associated with instruction 306 is executable on pipeline 206 (Pipe-4), the machine instruction associated with the instruction 308 is executable on pipeline 202 (Pipe-1), and the machine instruction associated with the instruction 310 is executable on pipeline 212 (Pipe-3).

As shown in FIG. 3, there is a Read-After-Write (RAW) data hazard between pipeline 206 (Pipe-4) and pipeline 202 (Pipe-1) and then between pipeline 202 (Pipe-1) and pipeline 212 (Pipe-3) because the results of the execution of the machine instruction associated with the instruction 306 by the pipeline 206 (Pipe-4) needs to be available for the pipeline 202 (Pipe-1) before pipeline starts its operation. However, there are also other data hazards due to the statement (e.g. the for loop). For example, pipeline 206 (Pipe-4) at iteration "i" needs to fully complete its write before pipeline 206 (Pipe-4) at iteration "i+1" starts executing the machine instruction associated with instruction 308. Thus there is a Write-After-Write (WAW) data-hazard for pipeline 308 (Pipe-1) and pipeline 306 (Pipe-4). Further, it is desirable to guarantee that pipeline 306 (e.g. pipe-4) at iteration "i+1" executes the machine instruction associated with instruction 306 only after pipeline 202 (Pipe-1) at iteration "i" has finished execution of the machine instruction associated with instruction (i.e., there is a Write-After-Read (WAR) data-hazard). Therefore, for the source code above to protect from the aforementioned hazards, it is desirable to use the synchronization instructions supported by the asynchronous processor architecture 200.

As shown in FIG. 3, when source code that written by a programmer is to be compiled by a compiler into object code for execution on a particular asynchronous processor architecture, such as architecture 100 or 200, the source code must be modified to include synchronization instructions in order to enforce data dependencies and to avoid data-hazards. The source code (referred to hereinafter as the original source code) is modified to generate synchronized source code using one of the following scenarios: (1) directly where synchronization instructions are inserted explicitly by programmers into the original source code (diagnostic information and reporting optimizations opportunity are relevant in such cases); (2) indirectly where: (a) programmers only describe data-dependencies and synchronization instructions are automatically inserted into the original source code (in some aspects, follow-up compiler optimizations may be essential to bring automatically generated synchronized source code close to manual efficiency); and (b) source code that is automatically generated from a math representation of the required functionality (e.g., auto-library-generation) (similar to the previous case, in some aspects, follow-up compiler optimizations may be essential to bring automatically generated synchronized code close to manual (optimized) efficiency.

Figure 4:
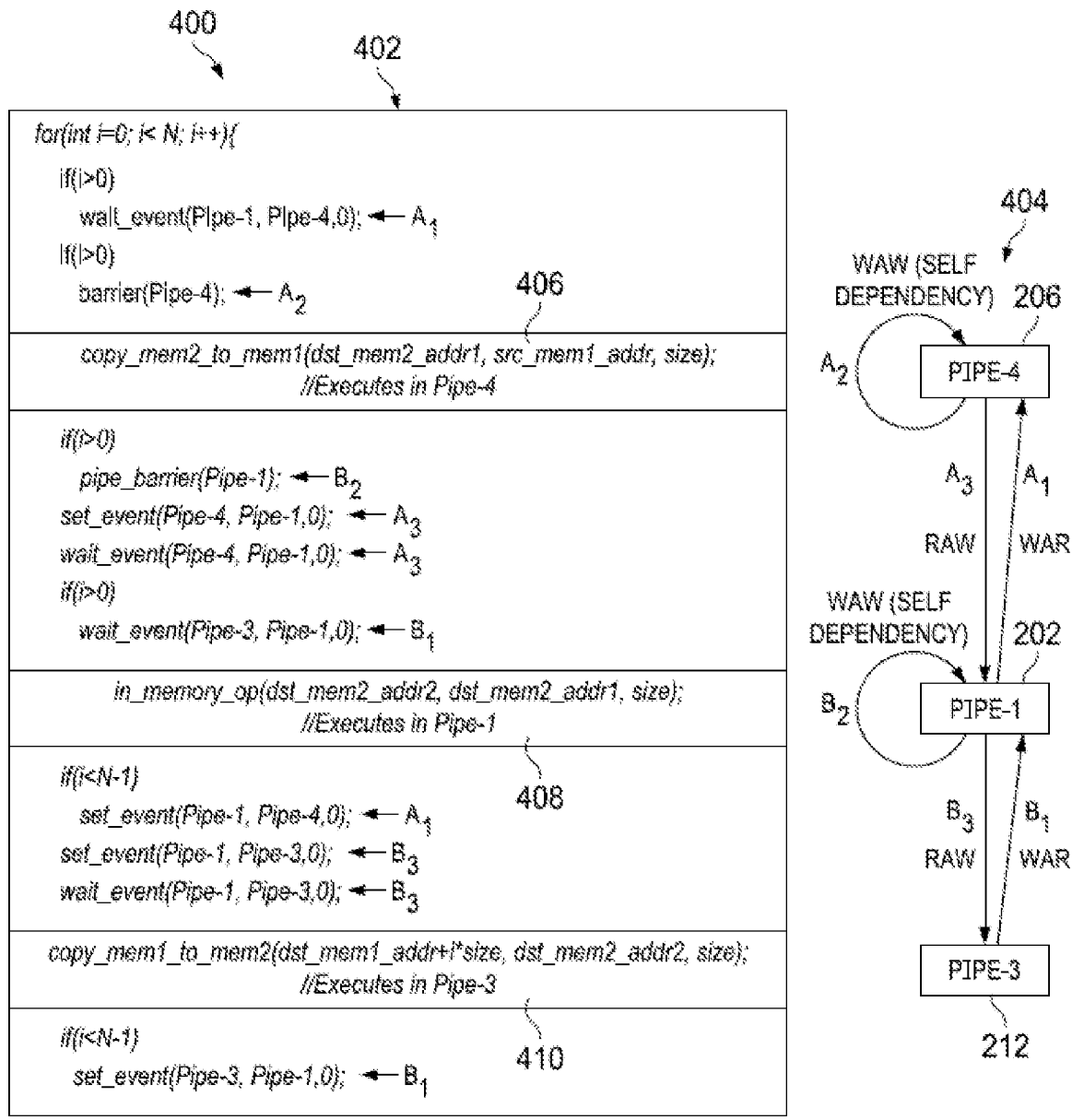
FIG. 4 is a diagram illustrating an example of a properly synchronized source code, and a corresponding schematic representation of the various pipelines of the asynchronous processor architecture of FIG. 2.

FIG. 4 is a diagram 400 illustrating an example of synchronized source code (e.g. source code that includes synchronization instructions) that does not include any broken code conditions, such as deadlock conditions, undefined behavior conditions, and data race conditions. The diagram 400 includes the synchronized source code 402 that includes statements 401, 403, 405, 407, 409, instructions 406, 408, 410, and synchronization 30 instructions A1, A2, A3, B1, B2, B3 and a schematic diagram 404 of the pipelines 202, 206, 212 of the architecture 200 of FIG. 2 as well. The synchronization instructions A1, A2, A3, B1, B2, B3 include barriers, set_events and wait_events. In the example synchronized source code 402 shown in FIG. 4, the two synchronization instructions $A_2$ and $B_2$ (e.g. barrier(Pipe-4) and pipe_barrier(Pipe-1)) are protecting against the WAW hazards. The pair of 35 synchronization instructions $A_1$ (e.g. wait_event(Pipe-1, Pipe-4, 0), set_event(Pipe-1, Pipe-4, 0)) and $B_1$ (e.g. wait_event(Pipe-1, Pipe-3, 0), set_event(Pipe-3, Pipe-1, 0) protects against-10-the RAW hazards. The pair of synchronization instructions $A_3$ (e.g. set_event(Pipe-4, Pipe-0, wait_event(Pipe-4, Pipe-1, 0)) and $B_3$ (e.g. set_event (Pipe-1, Pipe-3, 0, wait_event (Pipe-1, Pipe-3, 0)) protects against the WAR data hazards.

Figure 5:
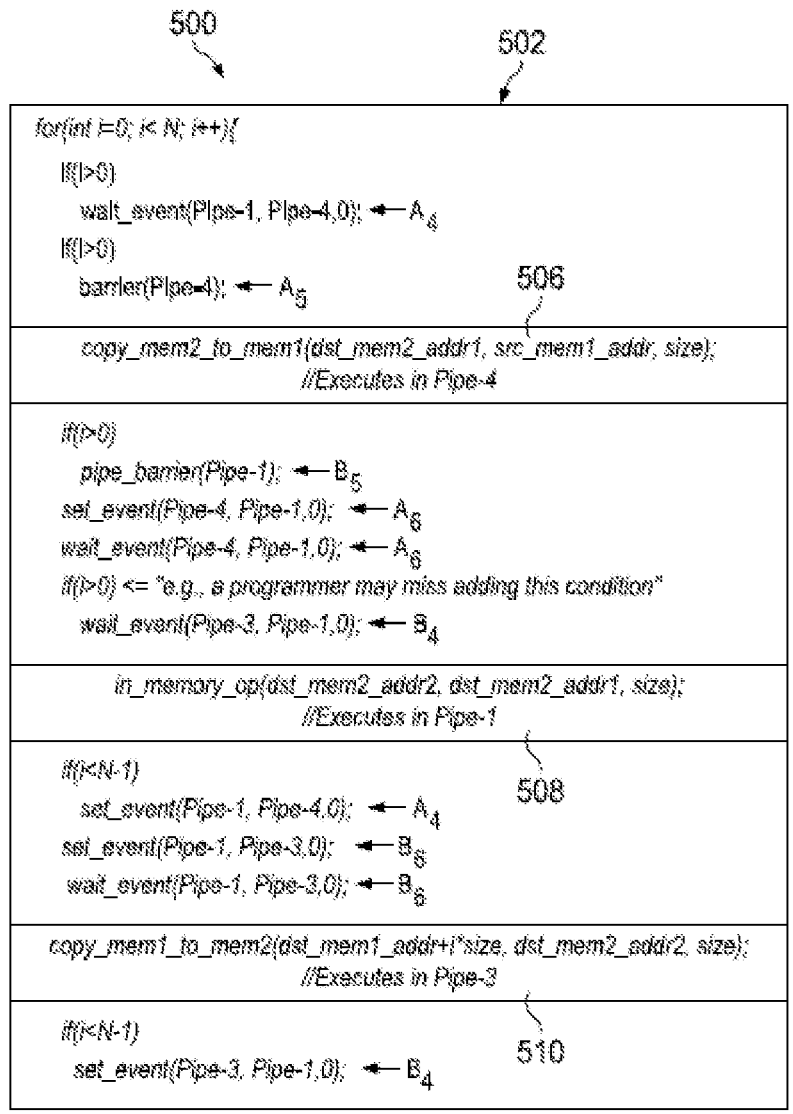
FIG. 5 is a diagram illustrating an example of source code that includes a deadlock condition.

FIG. 5 is a diagram 500 illustrating synchronized source code 502 similar to the synchronized source code 402 shown in FIG. 4, however, with a statement removed (the if(i>0) shown in italics in FIG. 5), which results in the synchronization code 506 having a deadlock condition. The deadlock condition in the synchronized source code 502 renders optimization of the synchronized source code 502 useless by a compiler because the compiled synchronized source code will not terminate when executed on an asynchronous process architecture. The synchronized source code 502 includes statements 501, 503, 505, 507, 509, 511, instructions 506, 508, 510 and synchronization instructions A4, A5, A6, B4, B5, B6.

The deadlock condition shown in synchronized source code 502 arises because the wait_event and set_event pairs of synchronization instructions are not properly inserted into the original source code. For example, if a wait_event is called at run-time without a corresponding set_event called earlier, this results in a deadlock condition. For example, the synchronized source code 502 depicted in FIG. 5 shows a deadlock condition due to the pair of synchronization instructions $B_1$ (e.g. wait_event(Pipe-3,Pipe-2,0), set_event (Pipe-3, Pipe-1, 0). In the synchronized source code 502, the wait_event $B_4$ (Pipe-3,Pipe-2,0) in the first loop iteration exists without a corresponding set_event $A_4$ (e.g. synchronization instructions A4), thus leading to a deadlock condition.

Figure 6:
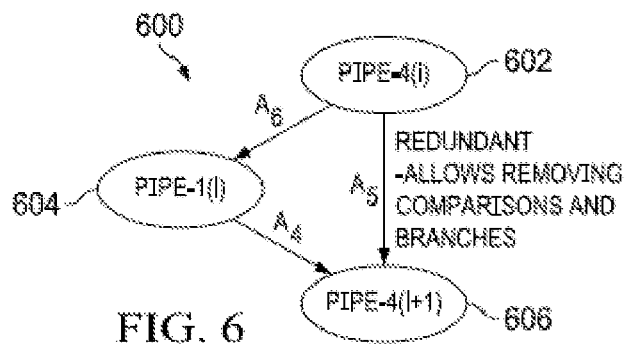
FIG. 6 is an example stage dependency graph that shows an opportunity for redundant synchronization instruction removal.

Another problem illustrated by the synchronized source code 502 in FIG. 5 is that it includes inconsistent, inaccurate, or inefficient synchronization instructions. In particular, the synchronized source code 502 includes redundant synchronization instructions (either added by a programmer or added automatically as described above) that also add control instruction overheads. For example, from the synchronized source code 502 shown in FIG. 5, a "happens-before relation" graph (otherwise known as a stage dependency" graph) as shown in FIG. 6 can be generated. FIG. 6 is an example stage dependency graph 600 that shows an opportunity for removal of redundant synchronization instructions. The dependency graph 600 shows a representation 602 of pipeline 206 (Pipe-4) executing the machine instruction associated with instruction 506 for iteration i of the synchronized source code 502, a representation 604 of pipeline 202 (Pipe-1) executing the machine instruction associated with the instruction 508 for iteration i of the synchronized source code 502, and a representation 606 of pipeline 206 (Pipe-4) executing the machine instruction associated with instruction 506 for iteration i+1 of the source code 502. The synchronization instruction $A_2$ (barrier(Pipe-4)) enforces that the execution of the machine instruction associated with instruction 506 for iteration (i) by pipeline 206 (Pipe-4) happens/finishes before the execution of the instruction 506 for iteration i+1 by pipeline 206 (Pipe-4(i+1)). The pair of synchronization instructions A6 enforces that the execution of the machine instruction associated with the instruction 506 by pipeline 206 (Pipe-4(i)) happens/finishes before the execution of the instruction 508 by pipeline 202 (Pipe-1(i)). The synchronization instructions A4 (e.g. the set_event (Pipe-4, Pipe-1,0) and wait_event(Pipe-4, Pipe-1, 0 pair) enforces that execution of the machine instruction associated with instruction 508 for iteration (i) by pipeline 202 (Pipe-1(i)) happens/finishes before execution of the machine instruction associated with the instruction 506 for iteration i+1 for pipeline 206 (Pipe-4(i+1)). From FIG. 6, it is clear that there is no need to add synchronization instruction $A_4$ (e.g. barrier(Pipe-4)) given that pipeline 206 for iteration i (Pipe-4(i)) is guaranteed to happen before execution of the instruction associated with instruction 506 for iteration i+1 for pipeline 206 (Pipe-4(i+1)) due to the synchronization instructions $A_4$ and $B_6$.

Figure 7:
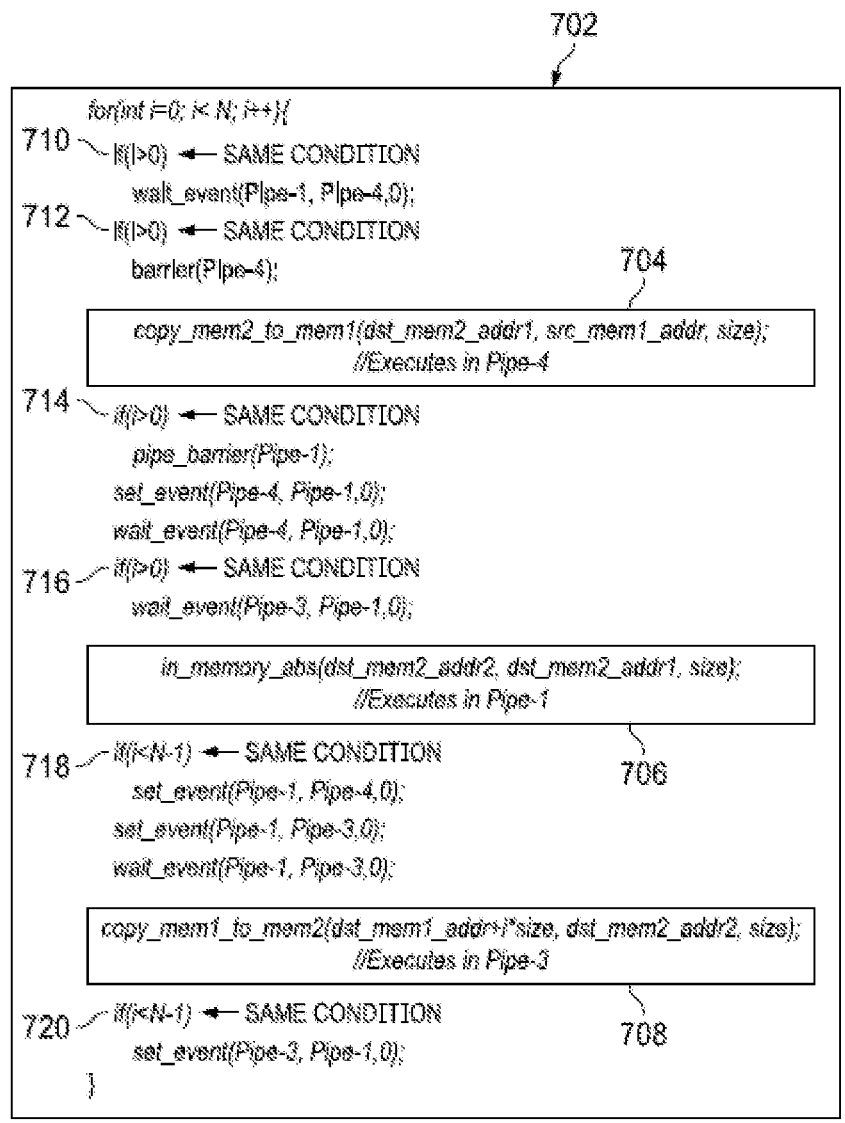
FIG. 7 is a diagram of synchronized source code illustrating identical code merge optimization under synchronization.

FIG. 7 is a diagram 700 illustrating synchronized source code 702 that include multiple identical conditional statements which may be merged to optimize the synchronized source code 502 to remove (e.g. correct) inconsistencies, inaccuracies, or inefficiencies in the synchronization instructions of the synchronized source code to improve the execution of the compiled synchronized source code on an asynchronous processor architecture. The synchronized source code depicted in FIG. 7 may be optimized because it does not include a broken code condition. The synchronized source code 702 includes three instructions 704, 706, 708, several conditional statements (conditions) 710, 712, 714, 716, 718, 720, and synchronization instructions. It is a common to protect synchronization instructions with a conditional statements. In many cases these conditions are common. Therefore, synchronization instructions can be merged in the same condition as long as it is safe to move these synchronization instructions. Thus, disclosed herein is an analysis of synchronized source code for merging synchronization instructions. In the example depicted in FIG. 7, conditions 710, 712, 714, 716 are identical conditions and conditions 718, 720 are identical conditions. Thus, in an aspect, conditions 710, 712, 714, 716 can be merged into a single conditional statement and conditions 718, 720 can be merged into a single conditional statement if it is safe to do so. For synchronization instructions, such as barriers, it is considered safe to merge such synchronization instructions of the same conditions into a single dominating synchronization instruction as long as no stage of the same pipeline is in the path between the dominating synchronization instructions and the current position of the barrier. For a wait event, it is considered safe to merge the conditions into a single dominating synchronization instruction as long as no stages of the consumer pipeline (with a predicate that intersects with the wait_event predicate) is in the path between the dominating synchronization instruction and the current position of the wait_event. For set_event, it is considered safe to merge the conditions into a single post-dominating synchronization instruction as long as no stages of the consumer pipeline (with a predicate that intersects with the set_event predicate) is in the path between the current position of the wait_event and the post_dominating synchronization instructions.

Figure 8:
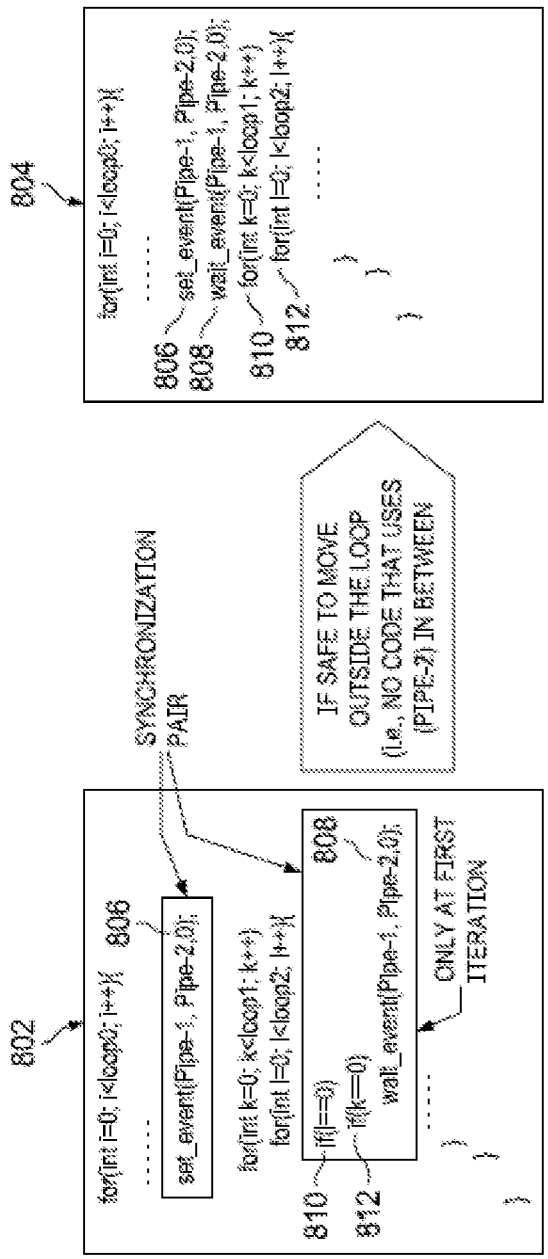
FIG. 8 is a diagram illustrating an example of loop-hoisting of synchronization primitives.

Another improvement in efficiency that is often possible in synchronized source code is hoisting a synchronization instruction outside a loop. FIG. 8 is a diagram illustrating an example of loop-hoisting of synchronization instructions. The synchronized source code 802 includes a pair of synchronization instructions comprising a set_event(Pipe-1, Pipe-2,0) 806 and wait_event(Pipe-1,Pipe-2,0) 808. The wait_event(Pipe-1,Pipe-2,0) 808 in the synchronized source code 802 is inside the loops 810, 812. Since no synchronization instructions that use Pipe-2 are in between the set_event(Pipe-1, Pipe-2,0) 806 and the wait_event(Pipe-1,Pipe-2,0) 808, it is safe to transform the synchronized source code 802 to move the wait_event(Pipe-1,Pipe-2,0) 808 outside the loop 810, 812 as shown in transformed synchronized source code 804.

Figure 9:
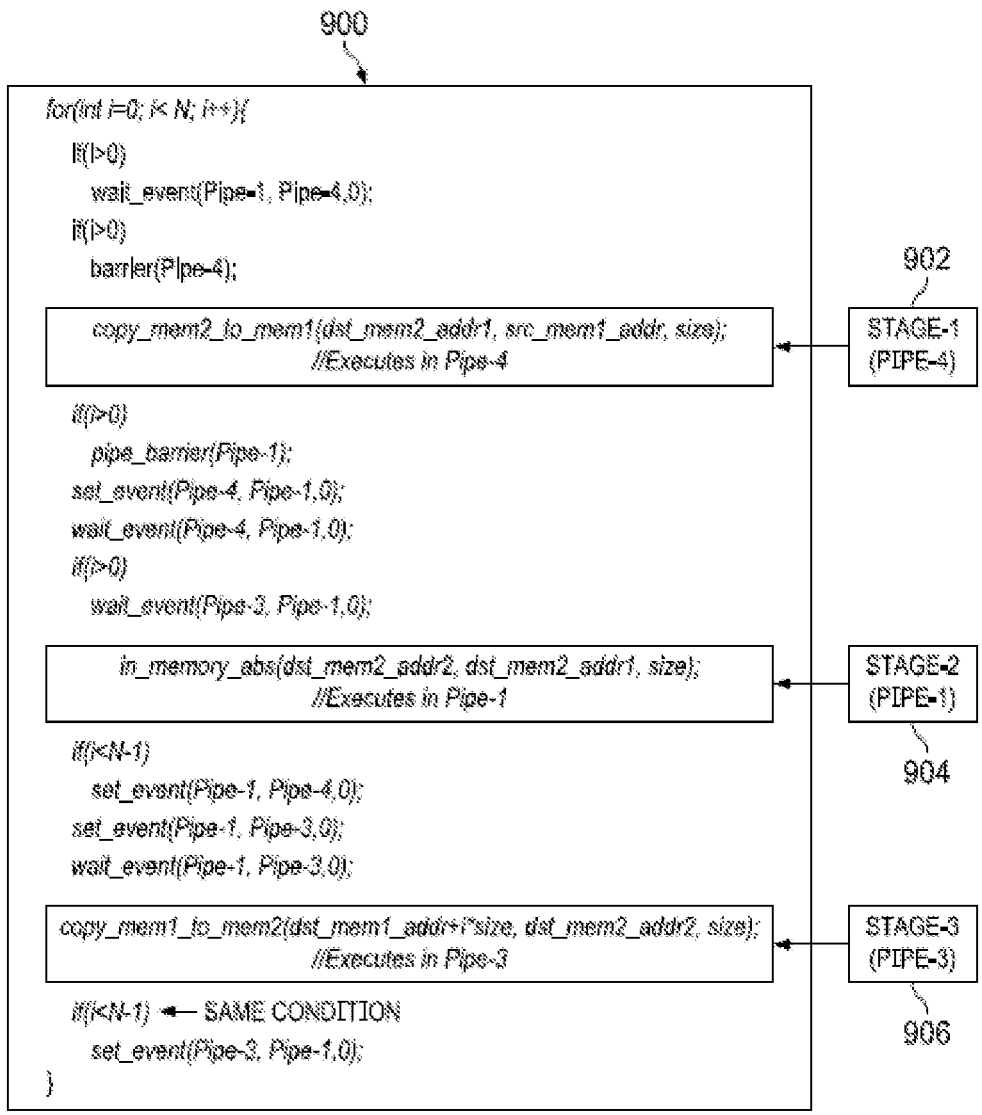
FIG. 9 is a diagram illustrating an example synchronized source code and the various stages included in the synchronized source code.

FIG. 9 is a diagram illustrating an example synchronized source code 900 and the various instructions 902, 904, 906 included in the synchronized source code 900. The synchronized source code 900 can be seen as a sequence of stages 902, 904, 906 where each stage includes instructions, which when compiled, execute on a specific pipeline 206, 202, 212 of the architecture 200. In the depicted example, pipeline 206 (Pipe-4) can be considered stage 1, pipeline 292 (Pipe-1) can be considered stage 2, and pipeline 212 (Pipe-3) can be considered stage 3. The synchronized source code 900 also include statements (e.g. "for loops") and the synchronization instructions are typically predicated with a condition that is a function in the induction variables and loop invariant parameters. Additionally, the order of synchronization instructions (e.g. barriers, wait events and set events) can be statically known given that synchronization instructions are functions in the iteration space.

Figure 10:
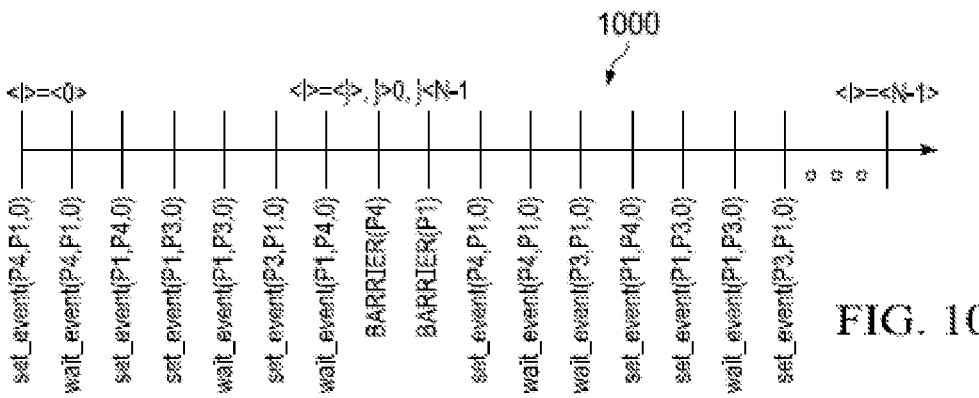
FIG. 10 is a diagram illustrating example synchronization instructions in an iteration space.

FIG. 10 is a diagram 1000 illustrating the synchronization instructions of FIG. 9 in an iteration space to facilitate detection of broken code conditions, such as a deadlock condition, an undefined behavior condition, or a data race condition, in the synchronized source code.

Figure 11:
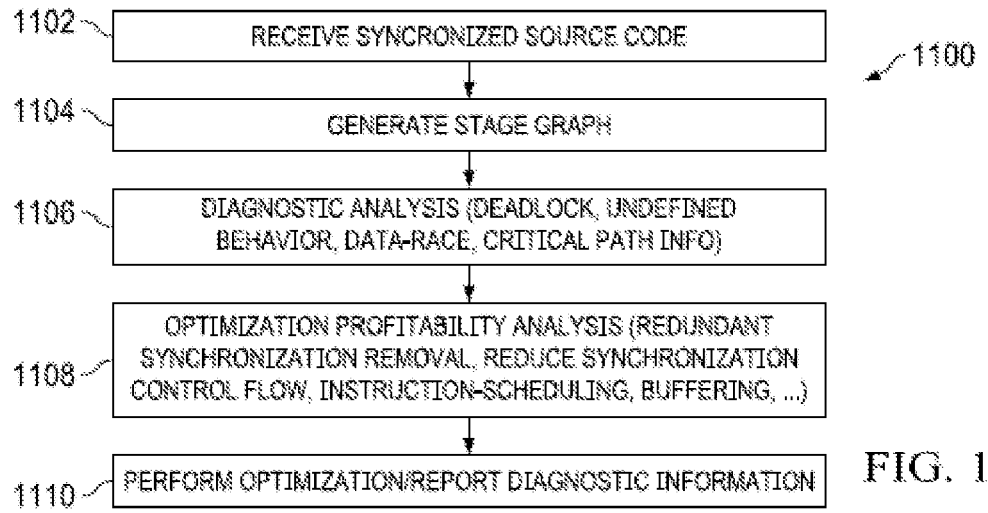
FIG. 11 is a flowchart of an embodiment of a method of performance optimization of synchronized source code in an asynchronous processor architecture.

FIG. 11 is a flowchart of an embodiment of a method 1100 of optimization of synchronized source code which can be compiled by a compiler for execution on an asynchronous processor architecture, such as architecture 100, 200. At block 1102, synchronized source code is received. The synchronized source code includes synchronization instructions that enable the synchronized source code when compiled by a compiler into object code to be executed on an asynchronous processor architecture. At block 1104, a stage graph is generated from the received synchronized source code as described in further detail below. At block 1106, a diagnostic analysis of the synchronized source code is performed to determine whether the synchronized source code includes a broken code condition. A broken code condition may be a deadlock condition in the synchronized source code, an undefined behavior condition in the synchronized source code, or a data race condition in the synchronized source code. In some embodiments, the diagnostic analysis is performed based on the generated stage graph. The stage graph is generated according to the synchronization instructions in the synchronized source code. The diagnostic analysis determines whether there are mismatched set and wait events that may result in a deadlock condition, undefined behavior condition, or a data-race condition. The diagnostic analysis may also determine critical path information from the synchronized source code. The critical path information is the dependent instruction stream that determines the total execution time since independent instructions may execute in parallel.

If at block 1106, the method 1100 determines that the synchronized source code includes a broken code condition, the method 1100 ends. Otherwise, if at block 1106, the method 1100 determines that the synchronized source code does not includes a broken code condition, the method 1100 proceeds to block 1108. At block 1108, a synchronization-aware optimization analysis (hereinafter referred to as optimization analysis) is performed to determine whether the synchronized source code includes inaccuracies, inconsistencies, or inefficiencies in the synchronization instructions of the synchronized source code. The optimization analysis determines whether there are redundant synchronization instructions in the synchronized source code that can be removed, reductions in synchronization control flow, improved instruction-scheduling, and improvements in buffering. The optimization analysis may be performed using the generated stage graph.

At block 1110, an optimization of the synchronized source code is performed and/or a report of information from the optimization analysis at block 1108 is generated. The report of information may include suggestions as to where redundant synchronization instructions may be merged into a single instructions, identification of mismatched set and wait events that result in broken source code condition, removal of redundant synchronization instructions, and moving set or wait events outside of a loop when safe to do so. In some aspects, rather than generating a report or in addition to generating a report, the inaccuracies, inconsistencies, or inefficiencies in the synchronized source code may be corrected automatically. In other aspects, rather than correcting inaccuracies, inconsistencies, or inefficiencies in the synchronized source code, the method 1100 generate a report that provides a programmer with suggestions for improving the synchronization in the synchronized source code and identifies the locations of inaccuracies, inconsistencies, or inefficiencies such as unmatched set and wait statements, redundant synchronization instructions, etc.

Figure 12:
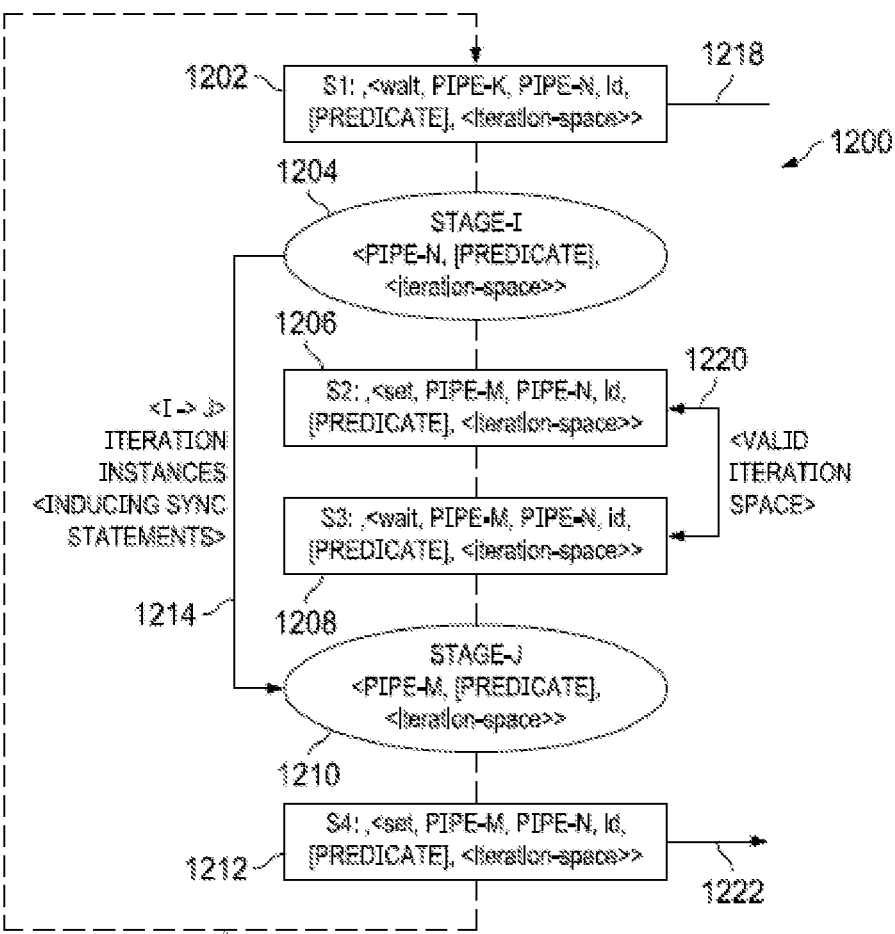
FIG. 12 is a diagram illustrating an example embodiment of a stage graph.

FIG. 12 is a diagram 1200 illustrating an example embodiment of a method of generating a stage graph. Diagram 1200 is an example of how a stage graph with two stages would look like in an embodiment. The diagram 1200 shows a schematic representation of a synchronized source code with synchronization instructions. The diagram 1200 includes a plurality of stages 1204, 1208 and synchronization instructions 1202, 1206, 1208, 1212. The plurality of stages 1204, 1208 and the synchronization instructions 1202, 1206, 1208, 1212 are vertices in a stage graph. The control flow edges 1216, the pairs of synchronization instructions 1218, 1220, 1222, and the "happens-before" stage relations 1214 are edges in the stage graph.

Figure 13:
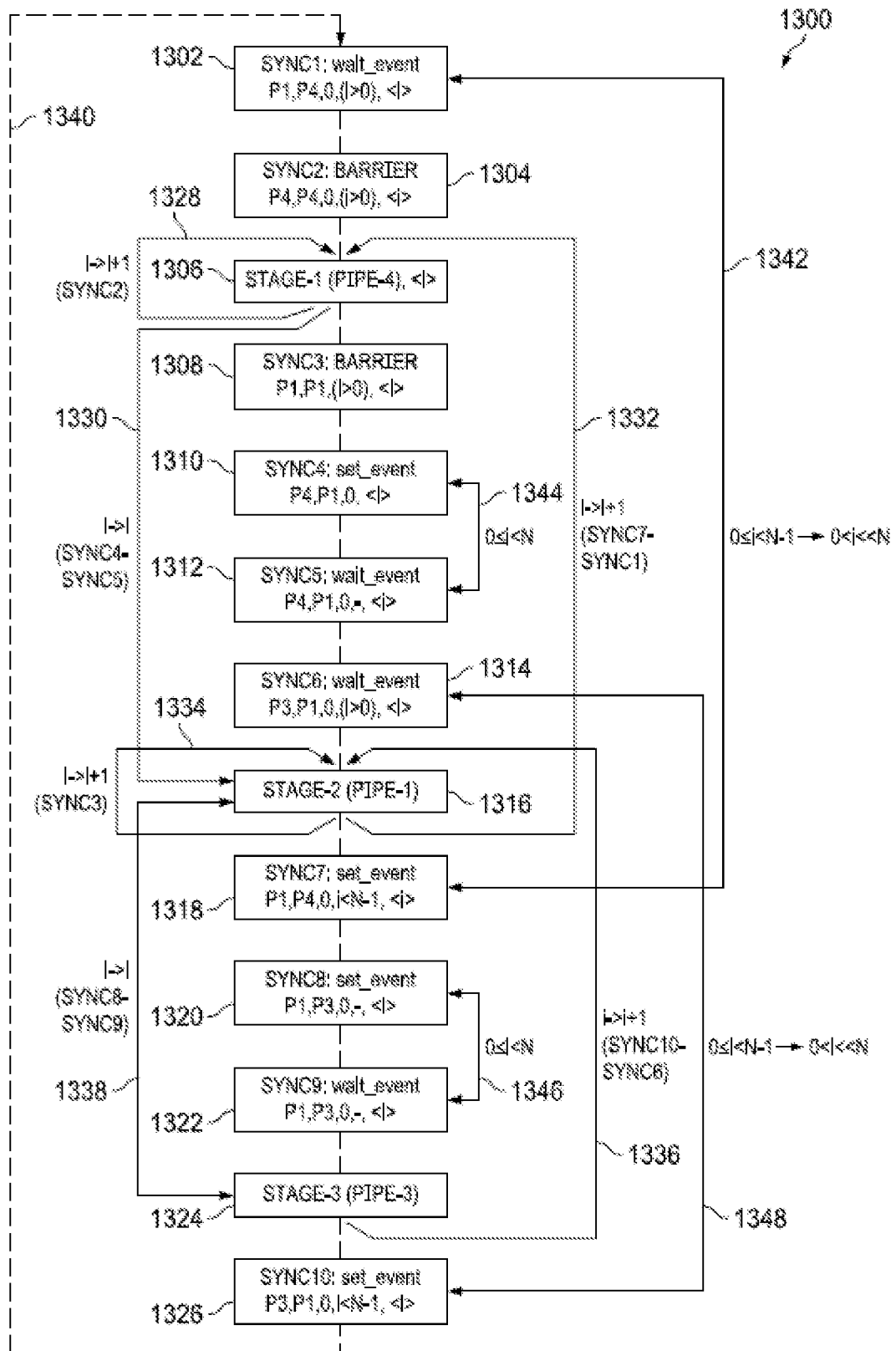
FIG. 13 is a diagram illustrating an example embodiment of a stage graph.

FIG. 13 is a diagram 1300 illustrating an example embodiment of a stage graph. The diagram 1300 shows a schematic representation of synchronized source code with multiple synchronization instructions. The synchronized source code, when complied into object code, is executable on an asynchronous processor architecture, such as architecture 100, 200. The diagram 1300 depicts the synchronized source code comprising a plurality of stages 1306, 1316, 1324 and synchronization instructions 1302, 1304, 1308, 1310, 1312, 1314, 1318, 1320, 1322, 1326. The plurality of stages 1306, 1316, 1324 and the synchronization instructions 1302, 1304, 1308, 1310, 1312, 1314, 1318, 1320, 1322, 1326 are vertices in a stage graph. The control flow edges 1340, the pairs of synchronization instructions 1342, 1344, 1346, 1348, and the "happens-before" stage relations 1328, 1330, 1332, 1334, 1336, 1338 are edges in the stage graph. The edge label for pairs of synchronization instructions 1342, 1344, 1346, 1348 includes an iteration space for which the pairs of synchronization instructions are valid. The edge label for "happens-before" stage relation 1328, 1330, 1332, 1334, 1336, 1338 showing relationships between stages includes the iteration instances where the "happens-before" relation holds and the synchronization instructions that are enforcing the relation.

In one aspect, the language of the source code exposes the stage abstraction. If the language already exposes an abstraction for stages and stage dependencies, then the stage boundaries are defined by programmers, the "happens-before" relationship is defined by programmers, and the synchronization instructions, such as wait events and set events are automatically inserted into the source code to generate synchronized source code (note that insertion techniques are outside the scope of this disclosure). Thus, pairs of synchronization instructions are known to compiler. For this scenario, stage information is propagated to the compiler through intrinsics and/or metadata. The intrinsics and/or metadata is updated if there are follow-up passes that affect stages or synchronization instructions. If such data is not complete, a stage graph is built from scratch.

Figure 14:
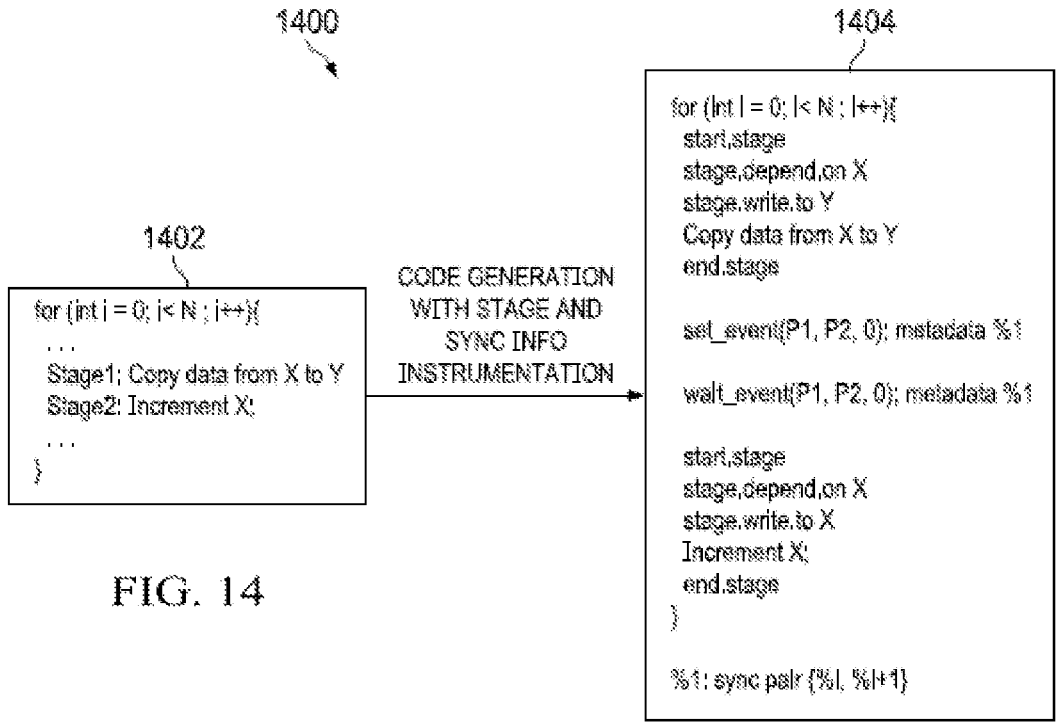
FIG. 14 is a diagram illustrating how the code language exposes stage abstraction for stage graph generation.

FIG. 14 is a diagram 1400 illustrating how the source code exposes stage abstraction for stage graph generation. In the example the source code 1402 includes language of "stage",-15-"for (int i=0; i<N; i++){" and "copy" statements with identification of dependencies on "X" and write to "Y". The construction of the synchronized source code 1404 generated with stage and synchronization information instrumentation is eased because of the given program abstraction.

In a second scenario in which there is no stage abstraction, synchronization instructions are inserted into the source code. Stage construction follows the steps outlined in Table 1 below.

TABLE 1

| | |
|---|---|
| 1. Virtual Predication | "Virtually" linearize Control Flow within loops. No need for actual predication. Just add all statements into a list along with their predicate. A loop can be considered as a compound statement. Each compound statement (i.e., loop) would have its own list of virtually predicated instructions. Most inner loops would have only simple statements. |
| 2. Defining Stage Boundaries | Single Entry - Single exit code block with instructions that is not interrupted by synchronization and executes on the same pipeline in addition to scalar and control flow computations. Stages from the same pipeline that are only separated by barriers can be optionally merged. |
| 3. Defining synchronization Pairs | For a set_event statement S, exclude all invalid sync statements (based on pipes and id), where valid statements are VS: solve the following: for each I ε predicate(S) find J = min (J0, J1, . . . Ji, JN) where Ji = min(j where j > I and j ε predicate(Si)) where Si ε VS This can be solvable using symbolic (predicate) analysis or symbolic execution. |
| 4. Defining happens before relationships | Extend dominance analysis as follows: To be predicate based. To be iteration space based (i.e., as if loops are unrolled). Stages of pipe P that dominates barrier(P) happens before stages of pipe P that postdominate barrier(P). Stages of pipe P1 that dominates set_event(P1.P2) happens before stages of pipe P2 that postdominate wait_event(P1, P2). |

Information can also be stored in metadata to simplify the reconstruction of the stage graph after optimizations that may affect it.

Regarding defining stage boundaries, there are some alternate ways of how to split stages, specially that scalar code can belong to any stage. The algorithm below make a stage terminates with non-scalar code thus scalar codes will be usually at the start of the stage.

Start from inner loops upward:
Iterate through loop body:
    track first and last statement in each stage
    Also track first scalar instruction after last non-scalar operation
    Sync statements terminate previous stages. First instruction in next stage will be the scalar instruction tracked.
Loops execution on a single pipe can be within a stage.

Following is source code to solve for defining pairs of synchronization when there is no stage abstraction:

```
PairMap = { }
for each set_event s_e:
  valid_events = get_valid_events(s_e);
  minIterationSpaceDistance = MAX;
  candidatePair = NULL;
  for each I in valid_iteration_space(s_e):
    for each event e in valid_events:
      J = find smallest instance J>I in valid_iteration_space(e);
      if(J < minIterationSpaceDistance){
      candidatePair = e;
      minIterationSpaceDistance = J;
      }
    If(candidatePair.Type==set_event) "undefined behavior at I for s_e";
    if(!candidatePair) "undefined behavior at I for s_e"; //no pair found
    if(!PairMap[candidatePair][I]) "undefined behavior at I for s_e"; // multiple waits
    PairMap[candidatePair][I] =e;
```

Two out of the box approaches can be used. One is a symbolic solver for inequalities.

A second is symbolic execution in which the program is symbolically executed until a cycle is reached and all execution paths are triggered. This can be used as a simple interpreter to interpret the pairs.

Regarding the defining "happens-before" relationships, the following pseudocode may be used:

```
For each synchronization statement/pair:
  If stmt = barrier:
    All stages of pipe P postdominated by barrier of pipe P happen
  before all stages of pipe P dominated by barrier or reachable through an
  edge.
    else if stmt = event_pair:
      All stages of producer pipe P1 that is postdominated by the
  set_event statement happens before all stages of consumer stages of
    consumer.
  Dominance should consider predicates. Also, should consider next
    iterations.
  Run (out of the box) transitive dependency removal to eliminate redun-
dant
dependencies.
```

Figure 15:
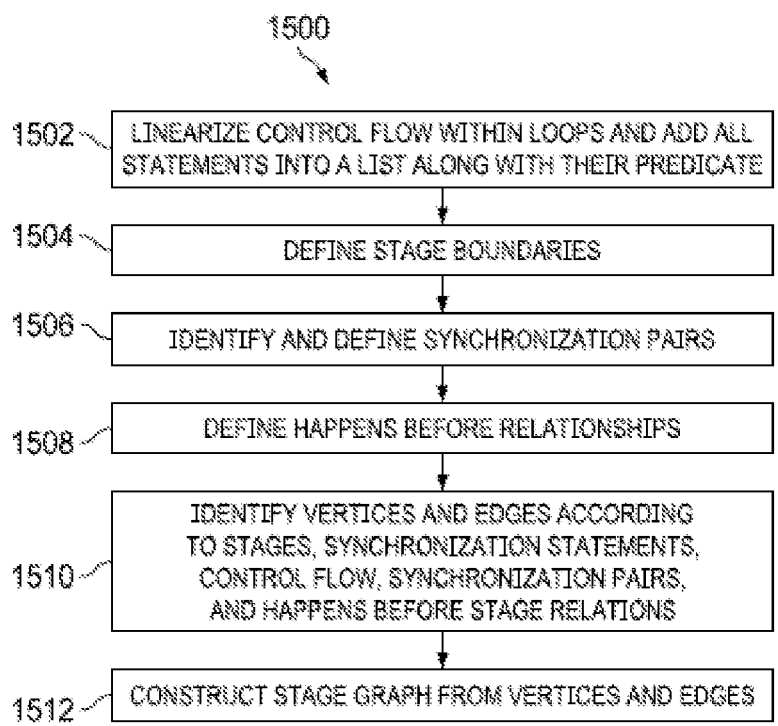
FIG. 15 is a flowchart illustrating an embodiment method for constructing a stage graph.

FIG. 15 is a flowchart illustrating an embodiment method 1500 for generating a stage graph. The method 1500 begins at block 1502 where virtual predication of the synchronized source code is performed. In an aspect, virtual predication includes "virtually" linearizing the control flow within the loops of the synchronized source code. As use herein, "virtually" linearizing" means that the synchronized source code transformation is not actually performed. Rather, the conditions for the synchronized source code transformation are stored in a separate data structure as part of the stage graph. There is no need for actual predication. Rather, it is sufficient to add all statements into a list along with their predicate. A loop can be considered as a compound statement. Each compound statement (i.e., loop) has its own list of virtually predicated instructions. Most inner loops would have only simple statements.

At block 1504, stage boundaries are defined. Single exit code block with instructions that are not interrupted by a synchronization instruction and that execute on the same pipeline in addition to scalar and control flow computations are considered part of a single stage. In an aspect, stages from the same pipeline that are only separated by barriers can be merged.

At block 1506, pairs of synchronization instructions are identified and defined. In an aspect, for a set_event synchronization instruction S, exclude all invalid synchronization 10 instructions (based on pipes and identifier (ID)), where valid instructions are indicated as "VS": solve the following: for each $I \in \text{predicate}(S)$ find $J=\min(J0, J1, \ldots Ji, JN)$ where $Ji=\min(j \text{ where } j>I \text{ and } j \in \text{predicate}(Si))$ where $Si \in VS$. This can be solvable using symbolic (predicate) analysis or symbolic execution.

At block 1508, the "happens-before" relationships are defined. At block 1510, the vertices and edges of the stage graph are identified according to the stages, the synchronization instructions, the control flow, the pairs of synchronization instructions, and the "happens-before" stage relations. In an aspect, extend dominance analysis as follows:

To be predicate based.

To be iteration space based (i.e., as if loops are unrolled).

Stages of pipeline(pipe P) that dominates barrier(P) happens before stages of pipeline (pipe P) that postdominate barrier(P).

Stages of pipe P1 that dominates set_event(P1.P2) happens before stages of pipe P2 that postdominate wait_event(P1,P2).

At block 1512, the stage graph is generated from the vertices and edges, after which, the method 1500 may end.

Once the stage graph is generated, it may be used to determine whether there is a broken code condition in the synchronized source code. Also, the generated stage graph may be used to identify inaccuracies, inconsistencies, or inefficiencies in the synchronized source code. After identifying inaccuracies, inconsistencies, or inefficiencies in the synchronized source code, the synchronized source code may be automatically optimize to remove (e.g. correct) the inaccuracies, inconsistencies, or inefficiencies in the synchronized source code and generate optimized synchronized source code, which when complied to object code (otherwise referred to as compiled synchronized source code), executes more efficiently on an asynchronous processor architecture. Alternatively, after identifying inaccuracies, inconsistencies, or inefficiencies in the synchronized source code, a report may be generated and provided to a programmer of the original source code. The report includes suggestions regarding possible improvements that may be made to the synchronized source code, to improve the execution performance of the complied synchronized source code. An overview of stage graph use is provided in Table 2 below.

TABLE 2

| | |
|---|---|
| 1. Virtual Predication | Conditions will be only for set/wait events and usually guard first and last iteration(s). |
| 2. Defining Stage Boundaries | Stage boundary are defined by the language or constructed such that they are inclusive to any conditions. |
| 3. Defining synchronization Pairs | remove invalid pairs. if set event in a loop and no condition (pair is a following wait_event in same loop). If set_event is the last iteration, then wait_event should be outside the loop. If set_event is except last iteration, then wait_event is within loop and except first iteration . . . |
| 4. Defining happens before relationships | Extend dominance analysis as follows: To be iteration space based (i.e., as if loops are unrolled). Stages of pipe P that dominates barrier(P) happens before stages of pipe P that postdominate barrier(P). Stages of pipe P1 that dominates set_event (P1.P2) happens before stages of pipe P2 that postdominate wait_event(P1, P2). |

Figure 16:
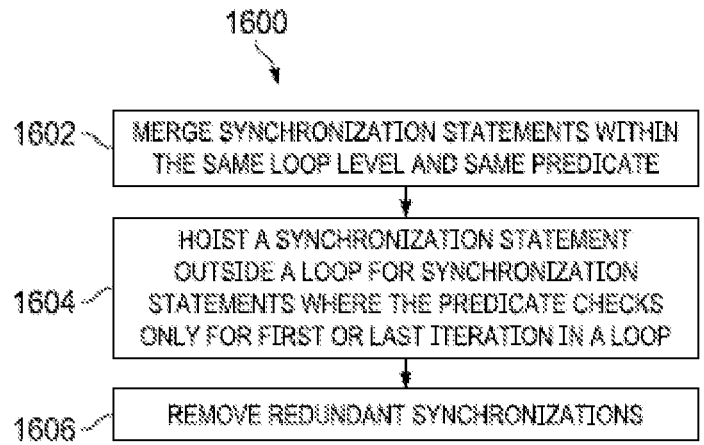
FIG. 16 is a flowchart illustrating an embodiment method for using a stage graph to detect inaccuracies, inconsistencies, and inefficiencies in synchronized source code that does not include a broken code condition.

FIG. 16 is a flowchart illustrating an embodiment method 1600 for optimizing the synchronized source code that does not include a broke source code condition to remove inaccuracies, inconsistencies, or inefficiencies in the synchronized source code. As mentioned above, synchronized source code may be analyzed to determine whether the synchronized source code include broken code conditions such as a deadlock condition, an undefined behavior condition, or a data race condition, by generating and analyzing a stage graph.

At block 1602, synchronization instructions within the same loop level and same predicate are merged. Synchronization instructions within the same loop level and same predicate can be merged if safe to do so. At block 1604, synchronization instructions where the predicate checks only for first or last iteration in a loop are hoisted outside the loop. Synchronization instructions where the predicate checks only for the first iteration or the last iteration in a loop can be moved outside the loop if it is safe to do so. Safety analysis is based on stage pipe information and control flow edges. As mentioned above, for barriers, it is considered safe to merge conditions into a single dominating synchronization instruction as long as no stage of the same pipe is in the path between the dominating synchronization instructions and the current position of the barrier. For a wait event, it is considered safe to merge the conditions into a single dominating synchronization instruction as long as no stages of the consumer pipe (with a predicate that intersects with the wait_event predicate) is in the path between the dominating synchronization instruction and the current position of the wait_event. For set_event, it is considered safe to merge the conditions into a single post-dominating synchronization instruction as long as no stages of the consumer pipeline (with a predicate that intersects with the set_event predicate) is in the path between the current position of the wait_event and the post_dominating synchronization instructions. The consumer pipeline is a pipeline that uses the results of the pipeline being optimized.

At block 1606, redundant instructions are removed from the synchronized source code by generating a "happens-before" graph and analyzing the generated "happens-before" graph. In an aspect, transitive dependencies in the "happens-before" graph are eliminated (either during the construction of the graph and/or as a transformation on the graph). When there is a synchronization instruction that does not show on any "happens-before" edge. Then, it is a redundant synchronization instruction that can be safely removed. In an aspect, the synchronized source code is modified according to the steps 1602, 1604, 1606. In other aspects, at the steps 1602, 1604, 1606, 1608 a report is generated and provided to a programmer of the source code. The report indicates where improvements i related to the synchronization instructions of the synchronized source code may achieve better performance of execution of the complied synchronized source code on an asynchronous processor architecture.

Figure 17:
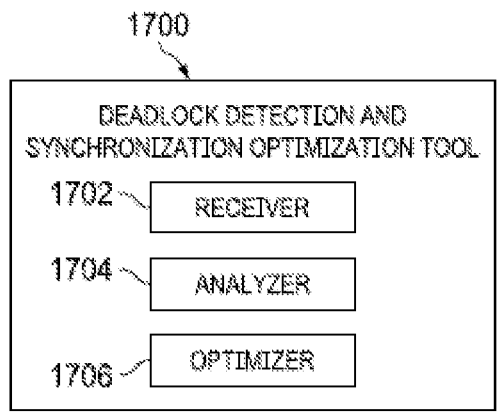
FIG. 17 illustrates an embodiment system for detection of broke code conditions in synchronized source code and optimization of synchronized source code.

FIG. 17 illustrates an embodiment system 1700 for detection of broke code conditions in synchronized source code and synchronization-aware optimization of synchronized source code. The system 1700 may execute the methods disclosed above. The system 1700 includes a receiver 1702, an analyzer 1704, and an optimizer 1706. In some embodiments, the system 1700 may include other components not shown. The analyzer 1704 and optimizer 1706 may include instructions which can be executed by one or more processors of a computing device. The receiver 1702 is configured to receive synchronized source code that includes synchronization instructions to synchronize execution of instructions of the synchronized source code on different pipelines of a pipelined asynchronous processor architecture, such as architecture 100, 200. The analyzer 1704 is configured to analyze the synchronized source code by generating a stage graph to determine if the synchronized source code includes a broken code condition, such as a deadlock condition undefined behavior condition, or a data race condition. The optimizer 1706 is configured to optimize the synchronized source code to correct inaccuracies, inconsistencies, or inefficiencies in the synchronized source code so that the compiled optimized synchronized source code executes efficiently on a pipelined asynchronous process architecture. The optimizer 1706 is configured to output a report that includes information indicative of a deadlock condition. The optimizer 1706 is also configured to output an optimized software program to correct inaccuracies, inconsistencies, or inefficiencies in the instructions of the software program.

Figure 18:
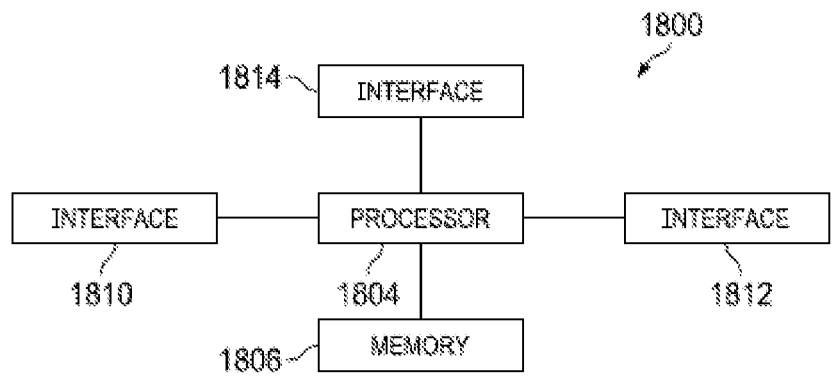
FIG. 18 illustrates a block diagram of an embodiment processing system for performing methods described herein, which may be installed in a computing device.

FIG. 18 illustrates a block diagram of an embodiment data processing system 1800 for performing methods described herein. As shown, the data processing system 1800 includes a processor 1804, a memory 1806, and interfaces 1810-1914, which may (or may not) be arranged as shown in the figure. The processor 1804 may be any component or collection of components adapted to perform computations and/or other processing related tasks, and the memory 1806 may be any component or collection of components adapted to store programming and/or instructions for execution by the processor 1804. In an embodiment, the memory 1806 includes a non-transitory computer readable medium. The interfaces 1810, 1812, 1814 may be any component or collection of components that allow the processing system 1800 to communicate with other devices/components and/or a user. For example, one or more of the interfaces 1810, 1812, 1814 may be adapted to communicate data, control, or management messages from the processor 1804 to applications installed on the host device and/or a remote device. As another example, one or more of the interfaces 1810, 1812, 1814 may be adapted to allow a user or user device (e.g., personal computer (PC), etc.) to interact/communicate with the processing system 1800. The processing system 1800 may include additional components not depicted in the figure, such as long term storage (e.g., non-volatile memory, etc.).

In some embodiments, the data processing system 1800 is in a computing device such as a mobile station, a user equipment (UE), a personal computer (PC), a tablet, a wearable communications device (e.g., a smartwatch, etc.), or any other device adapted to access a telecommunications network.

It should be appreciated that one or more steps of the embodiment methods provided herein may be performed by corresponding units or modules. Synchronized source code may be split into a plurality of stages by a splitting unit or splitting module or a splitter. Synchronization instructions in the synchronization source code may be analyzed by a synchronization analysis unit or synchronization analysis module or an analyzer. Inaccuracy, inconsistency, or inefficiency in the synchronization instructions in the synchronized source code may be determined by an efficiency unit or efficiency module or a synchronization error analyzer. A corrective action may be performed by a correcting unit or correcting module or a code corrector. Other steps may be performed by other units or modules. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving, by a processing system, synchronized source code comprising synchronization instructions to synchronize execution of the synchronized source code on different pipelines of an asynchronous processor architecture, wherein the synchronization instructions comprise wait events and set events;
   determining, by the processing system, whether the synchronized source code includes a broken code condition, wherein the broken code condition is a deadlock condition determined according to a mismatch in the synchronization instructions of the synchronized source code, and wherein the mismatch in the synchronization instructions comprises one of a wait event without a corresponding set event or a set event without a corresponding wait event;
   after determining, by the processing system, that the synchronized source code does not include any broken code condition, outputting an indication of synchronization inaccuracy, inconsistency, or inefficiency in the synchronized source code based on an optimization analysis of the synchronized source code; and
   outputting, by the processing system, optimized synchronized source code generated by performing a corrective action on the synchronized source code to correct the synchronization inaccuracy, inconsistency, or inefficiency in the synchronized source code, wherein the corrective action comprises reduction of synchronization control overhead in the synchronized source code, and wherein the reduction of synchronization control overhead comprises:

moving one of the wait event or a barrier up in the synchronized source code when no condition in the synchronized source code between a first location in the synchronized source code occupied by the wait event or the barrier and a second location to which the wait event or the barrier is moved depend on the wait event, or
   moving the set event down from a first location in the synchronized source code to a second location in the synchronized source code when no condition in the synchronization instructions depends on the set event is located between the first and the second location.

2. The method of claim 1, further comprising:
   presenting an alert that the synchronized source code includes a broken source code condition when the synchronized source code comprises a missing set event corresponding to the wait event.

3. The method of claim 2, wherein the corrective action comprises:
   providing a report comprises suggestion to a programmer to one of remove the wait event or insert the corresponding set event.

4. The method of claim 3, wherein the synchronization inaccuracy, inconsistency, or inefficiency comprises a redundant synchronization instruction.

5. The method of claim 4, wherein the corrective action comprises removing the redundant synchronization instruction.

6. The method of claim 4, wherein the reduction of synchronization control overhead further comprises:
   merging the redundant synchronization instruction in the synchronized source code.

7. The method of claim 1, wherein the reduction of synchronization control overhead comprises:
   hoisting synchronization instructions outside of a loop in the synchronized source code when there is no condition in the synchronized source code that uses the synchronization instructions inside the loop.

8. The method of claim 1, wherein the outputting comprises:
   outputting a report that includes information obtained from the optimization analysis.

9. The method of claim 1, further comprising:
   after determining, by the processing system, that the synchronized source code includes a broken source code condition, outputting a report that includes information indicative of the broken source code condition.

10. The method of claim 1, the determining further including:
    determining, by the processing system, whether the synchronized source code includes a second broken code condition, wherein the second broken code condition is one of an undefined behavior condition or a data race condition.

11. The method of claim 1, further comprising:
    generating a stage graph according to the synchronized source code, wherein the determining comprises determining whether the synchronized source code includes the broken code condition according to the stage graph.

12. The method of claim 11, wherein the optimization analysis of the synchronized source code is performed using the stage graph.

13. The method of claim 1, wherein the determining, whether the synchronized source code includes the broken code condition is based on a diagnostic analysis of the synchronized source code.

14. The method of claim 1, wherein the outputting the indication and the outputting the optimized synchronized source code are performed without any runtime analysis.

15. A data processing system comprising:
   a memory storing instructions; and
   one or more processors in communication with the memory, wherein the one or more processors execute the instructions for the data processing system to perform:
      receiving a synchronized source code comprising synchronization instructions to synchronize execution of the synchronized source code on different pipelines of an asynchronous processor architecture, wherein the synchronization instructions comprise wait events and set events;
      determining whether the synchronized source code includes a broken code condition, wherein the broken code condition is a deadlock condition determined according to a mismatch in the synchronization instructions of the synchronized source code, and wherein the mismatch in the synchronization instructions comprises one of a wait event without a corresponding set event or a set event without a corresponding wait event;
      after determining that the synchronized source code does not include any broken code condition, outputting an indication of synchronization inaccuracy, inconsistency, or inefficiency in the synchronized source code based on an optimization analysis of the synchronized source code; and
      outputting optimized synchronized source code generated by performing a corrective action on the synchronized source code to correct the synchronization inaccuracy, inconsistency, or inefficiency in the synchronized source code, wherein the corrective action comprises reduction of synchronization control overhead in the synchronized source code, and wherein the reduction of synchronization control overhead comprises:
         moving one of the wait event or a barrier up in the synchronized source code when no condition in the synchronized source code between a first location in the synchronized source code occupied by the wait event or the barrier and a second location to which the wait event or the barrier is moved depend on the wait event, or
         moving the set event down from a first location in the synchronized source code to a second location in the synchronized source code when no condition in the synchronization instructions depends on the set event is located between the first and the second location.

16. A non-transitory computer-readable medium storing instructions that, when executed by one or more processors of a computing device, causes the one or more processors to perform operations, the operations comprising:
   receiving synchronized source code comprising synchronization instructions to synchronize execution of the synchronized source code on different pipelines of an asynchronous processor architecture, wherein the synchronization instructions comprise wait events and set events;
   determining whether the synchronized source code includes a broken code condition, wherein the broken code condition is a deadlock condition determined according to a mismatch in the synchronization instructions of the synchronized source code, and wherein the mismatch in the synchronization instructions comprises one of a wait event without a corresponding set event or a set event without a corresponding wait event;
   after determining that the synchronized source code does not include any broken code condition, outputting an indication of synchronization inaccuracy, inconsistency, or inefficiency in the synchronized source code based on an optimization analysis of the synchronized source code; and
   outputting optimized synchronized source code generated by performing a corrective action on the synchronized source code to correct the synchronization inaccuracy, inconsistency, or inefficiency in the synchronized source code, wherein the corrective action comprises reduction of synchronization control overhead in the synchronized source code, and wherein the reduction of synchronization control overhead comprises:
      moving one of the wait event or a barrier up in the synchronized source code when no condition in the synchronized source code between a first location in the synchronized source code occupied by the wait event or the barrier and a second location to which the wait event or the barrier is moved depend on the wait event, or
      moving the set event down from a first location in the synchronized source code to a second location in the synchronized source code when no condition in the synchronization instructions depends on the set event is located between the first and the second location.

* * * * *